United States Patent [19]

Betros et al.

[11] Patent Number: 5,287,792
[45] Date of Patent: Feb. 22, 1994

[54] HYDRAULIC POWER STEERING GEAR WITH NOISE ATTENUATION

[75] Inventors: Robert S. Betros, Hermosa Beach; Jon W. Martin, Los Alamitos, both of Calif.

[73] Assignee: TRW Inc., Lyndhurst, Ohio

[21] Appl. No.: 967,140

[22] Filed: Oct. 27, 1992

[51] Int. Cl.$^5$ ............................................. F15B 9/10
[52] U.S. Cl. ................................. 91/375 R; 60/384; 180/141
[58] Field of Search ............... 91/374, 375 R, 375 A, 91/373, 434; 60/384, 385; 180/141, 133

[56] References Cited

U.S. PATENT DOCUMENTS

| | | |
|---|---|---|
| 3,022,772 | 2/1962 | Zeigler et al. . |
| 3,138,069 | 6/1964 | Bishop . |
| 3,991,656 | 11/1976 | Miyata et al. ............... 91/375 A X |
| 4,189,024 | 2/1980 | Jabonsky ..................... 91/375 A X |
| 4,220,072 | 9/1980 | Numazawa et al. . |
| 4,561,516 | 12/1985 | Bishop et al. . |
| 4,570,735 | 2/1986 | Duffy ........................... 91/375 A X |
| 4,793,433 | 12/1988 | Emori et al. . |
| 4,942,803 | 7/1990 | Rabe et al. . |
| 5,058,695 | 10/1991 | Terada . |

FOREIGN PATENT DOCUMENTS

| | | | |
|---|---|---|---|
| 0020530 | 2/1977 | Japan ........................ 375A |
| 2238845 | 6/1991 | Great Britain ............ 375A |
| 0453919 | 10/1991 | European .................. 375A |

OTHER PUBLICATIONS

Science and Technology of Rubber, Frederick R. Eirich, Academic Press, New York, 1978, pp. 179-184.

Primary Examiner—Edward K. Look
Assistant Examiner—Hoang Nguyen
Attorney, Agent, or Firm—Tarolli, Sundheim & Covell

[57] ABSTRACT

A hydraulic power steering apparatus (10) comprises a rotatable input member (31), a rotatable output member (130), and a housing supporting (11) the input member (31) and the output member (130) for rotation about an axis (45) relative to each other. A hydraulic control valve assembly (30) in the housing (11) includes a valve core (40), a valve sleeve (41) and a plurality of hydraulic seals (120-126) which block leakage of hydraulic fluid from the valve assembly (30). The hydraulic power steering apparatus (10) further includes an elastomeric damping ring (200) extending circumferentially between the valve core (40) and the valve sleeve (41). The elastomeric damping ring (200) damps vibrations of the valve core (40) relative to the valve sleeve (41), and thereby attenuates noise in the apparatus (10).

5 Claims, 3 Drawing Sheets

HYDRAULIC POWER STEERING GEAR WITH NOISE ATTENUATION

FIELD OF THE INVENTION

The present invention relates to a hydraulic power steering gear for steering a vehicle.

BACKGROUND OF THE INVENTION

A hydraulic power steering gear for steering a vehicle includes a directional control valve assembly. The steering gear also includes a piston and a mechanical steering linkage which is connected between the piston and the steerable wheels of the vehicle. The directional control valve assembly operates in response to rotation of an input shaft which is connected to the steering wheel of the vehicle. Depending upon the direction in which the steering wheel and the input shaft are turned by the operator of the vehicle, the directional control valve assembly directs a pressurized flow of hydraulic fluid to either one of two sides of the piston. The directional control valve assembly simultaneously directs the hydraulic fluid from the other side of the piston to the fluid reservoir. The directional control valve assembly thus pressurizes one side of the piston and vents the other side of the piston. The hydraulic fluid pressure acting on the piston then causes the piston to move in the selected direction. The mechanical steering linkage responds to movement of the piston by turning the steerable wheels in the selected direction.

The directional control valve assembly includes a valve core and a valve sleeve. The valve core and the valve sleeve have surfaces which define hydraulic fluid flow paths through the valve assembly, and are supported to rotate relative to each other. The valve core is connected to the input shaft to rotate relative to the valve sleeve when the operator of the vehicle turns the steering wheel. The valve sleeve is connected to the piston to rotate relative to the valve core when the piston moves. When the valve core is rotated relative to the valve sleeve upon rotation of the steering wheel, the hydraulic fluid flow paths defined by the valve core and the valve sleeve are adjusted so as to pressurize one side of the piston and simultaneously to vent the other side of the piston. The piston then moves and the steerable vehicle wheels are steered accordingly. When the piston is thus moved to effect steering of the vehicle wheels, the valve sleeve is rotated relative to the valve core in a follow-up manner. The valve sleeve and the valve core are thus returned to their centered positions as steering of the wheels in the selected direction is completed.

The pressurized flows of hydraulic fluid in the directional control valve assembly cause the valve core to vibrate relative to the valve sleeve. The vibrations can cause noises that are audible to the occupants of the vehicle.

SUMMARY OF THE INVENTION

In accordance with the present invention, a hydraulic power steering apparatus comprises a rotatable input member, a rotatable output member, and a housing supporting the input member and the output member for rotation about an axis relative to each other. The steering apparatus further comprises a hydraulic valve means. The hydraulic valve means includes a valve core, a valve sleeve and sealing means. The valve core is supported in the housing to rotate with the input member relative to the output member and the valve sleeve. The valve sleeve is supported in the housing to rotate with the output member relative to the input member and the valve core. The sealing means blocks leakage of hydraulic fluid from the valve means.

The steering apparatus further comprises means for attenuating noise upon vibration of the valve core relative to the valve sleeve. The noise attenuating means comprises an elastomeric damping ring for damping vibrations of the valve core relative to the valve sleeve. The elastomeric damping ring extends circumferentially between a cylindrical surface of the valve core and an adjoining, relatively rotating cylindrical surface of the valve sleeve.

When the valve core vibrates relative to the valve sleeve during operation of the steering apparatus, the damping ring undergoes cyclic deformation in shear between the adjoining cylindrical surfaces. The damping ring experiences hysteretic energy loss when it undergoes such cyclic deformation. The amount of hysteretic energy loss in the damping ring is proportional to the frequency of the cyclic deformations. An audible noise is generated by the vibrating valve parts, and is especially loud when the valve parts vibrate within a particular range of frequencies. The damping ring is designed to experience an optimum amount of hysteretic energy loss when it undergoes cyclic deformation within that range of frequencies. The damping ring is thus designed to dissipate an optimum amount of energy which would otherwise be expended through noise-making vibrations. The damping ring therefore effectively prevents the occurrence of an instability in the steering apparatus by dissipating energy in relative vibration between the valve core and the valve sleeve, and thus minimizes noise in the steering apparatus.

BRIEF DESCRIPTION OF THE DRAWINGS

The foregoing and other features of the present invention will become apparent to those skilled in the art upon reading the following description of a preferred embodiment of the present invention in view of the accompanying drawings, wherein.

DESCRIPTION OF A PREFERRED EMBODIMENT

Figure 1:
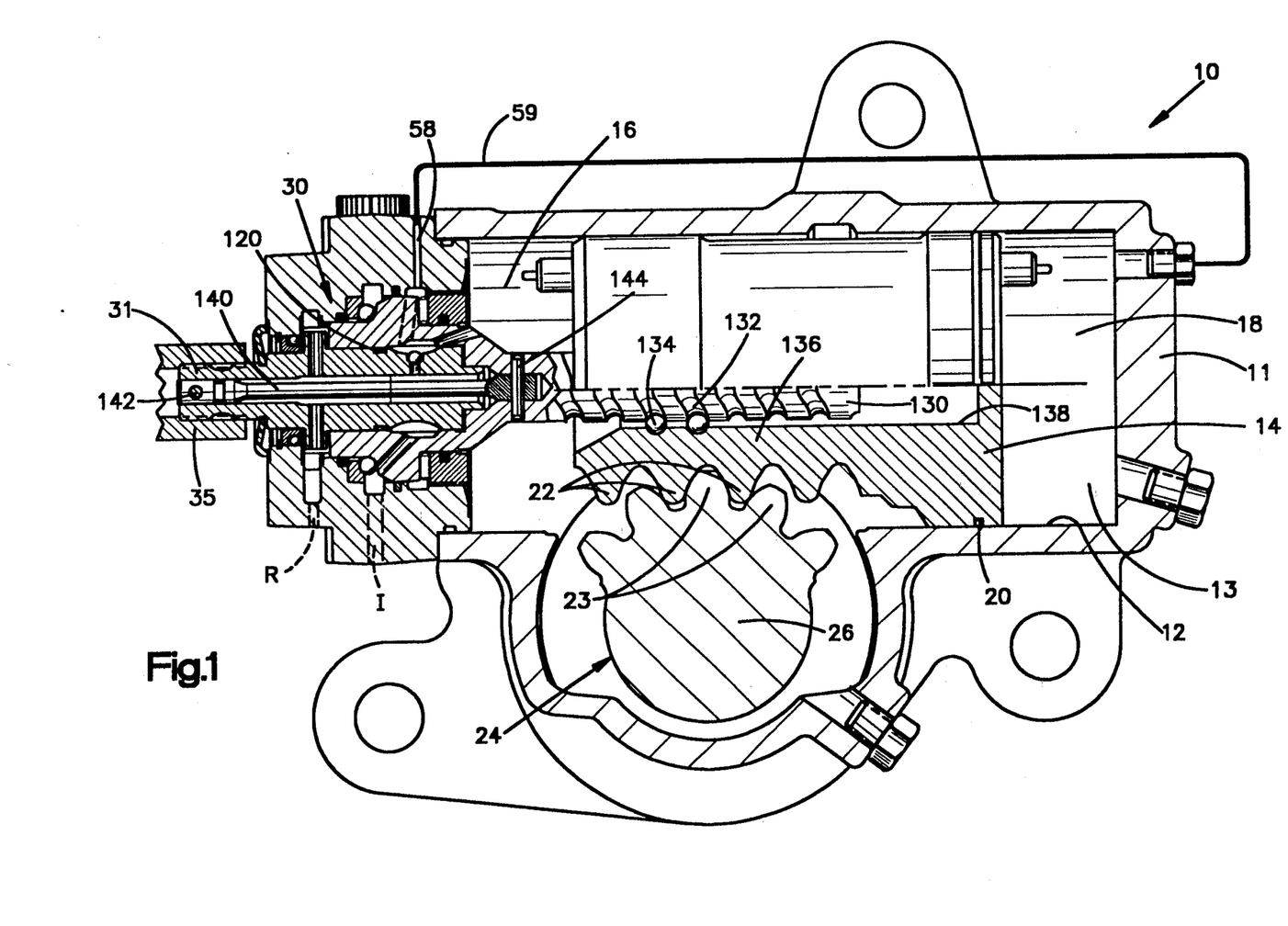
FIG. 1 is a sectional view of a steering gear constructed in accordance with the present invention.

A hydraulic power steering gear 10 constructed in accordance with the present invention is shown in FIG. 1. By way of example, the steering gear 10 is a TRW Ross Gear TAS40, TAS55, or TAS65 Series Integral Power Steering Gear. The steering gear 10 operates to turn the steerable wheels of a vehicle to effect steering of the vehicle. The steering gear 10 includes a housing 11. The housing 11 has an inner cylindrical surface 12 defining a chamber 13. A piston 14 divides the chamber 13 into opposite chamber portions 16 and 18 located at opposite ends of the piston 14. A seal 20 carried in a groove in the piston 14 provides a hydraulic fluid seal between the chamber portions 16 and 18.

A series of rack teeth 22 are formed on the periphery of the piston 14. The rack teeth 22 on the piston 14 mesh with teeth 23 formed on a sector gear 24. The sector gear 24 is fixed on an output shaft 26 which extends outwardly from the steering gear 10 through an opening in the housing 11. The output shaft 26 is typically connected to a pittman arm (not shown), which in turn is connected to the mechanical steering linkage of the vehicle. As the piston 14 moves in the chamber 13, the output shaft 26 is rotated to operate the steering linkage, as understood by those skilled in the art.

The housing 11 has a fluid inlet port I and a fluid return port R, and houses a directional control valve assembly 30. The inlet port I and the return port R are adapted to be connected in fluid communication with hydraulic circuitry (not shown) including a power steering pump. Pressurized hydraulic fluid directed from the pump to the inlet port I is further directed to one or the other of the chamber portions 16 and 18 by the directional control valve assembly 30. Fluid from the other of the chamber portions 16 and 18 is simultaneously directed by the directional control valve assembly 30 to the return port R, which communicates with the fluid reservoir of the power steering pump.

The valve assembly 30 is actuated by a manually rotatable input shaft 31. The input shaft 31 is supported for rotation relative to the housing 11. An outer end portion 33 of the input shaft 31 is splined for connection with a shaft 35. The shaft 35 is connected with a steering wheel which is manually turned by the operator of the vehicle to effect steering of the vehicle.

Figure 2:
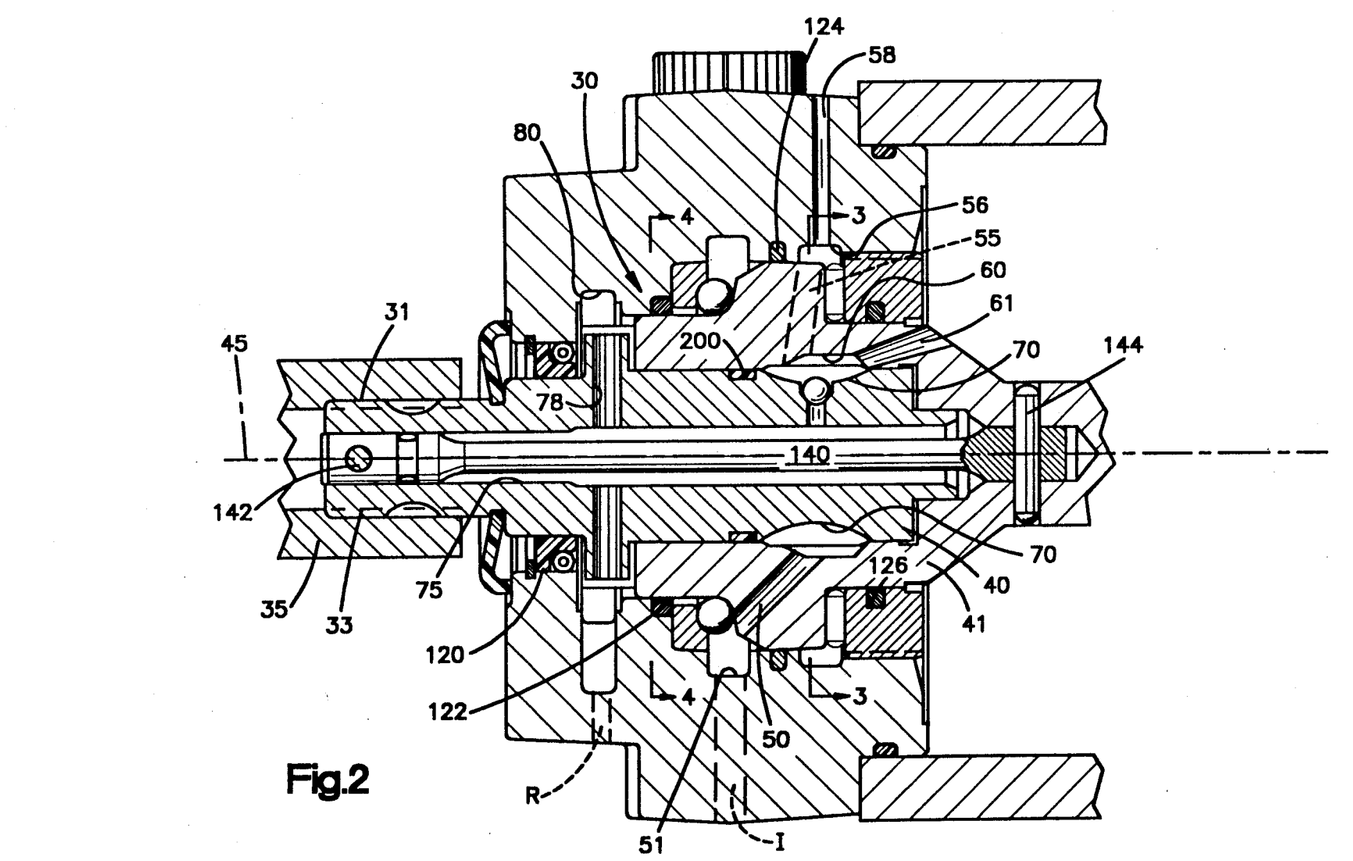
FIG. 2 is an enlarged view of a portion of the steering gear of FIG. 1.
Figure 3:
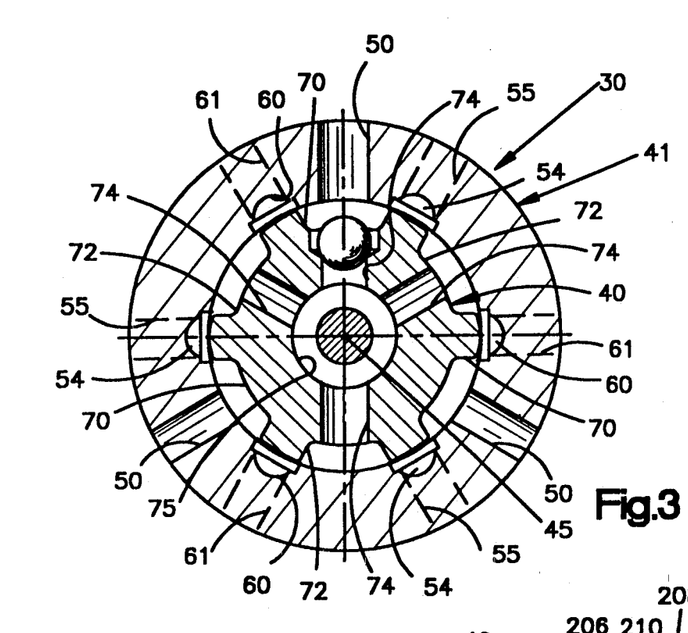
FIG. 3 is a view taken on line 3—3 of FIG. 2.

As shown in FIG. 2, the valve assembly 30 includes a valve core part 40 and a valve sleeve part 41. The valve core part 40 is located coaxially within the valve sleeve part 41. The valve core part 40 and the valve sleeve part 41 are supported to rotate relative to each other about the central axis 45 of the valve assembly 30. As shown in FIG. 3, the valve sleeve part 41 has three inlet passages 50 extending radially from its cylindrical outer surface to its cylindrical inner surface. The inlet passages 50 are spaced 120° from each other about the circumference of the valve sleeve part 41. The inlet passages 50 communicate with an annulus 51 (FIG. 2) in the housing 11. The annulus 51 in turn communicates with the inlet port I, and is thus subjected to the hydraulic fluid pressure provided at the inlet port I by the power steering pump.

The valve sleeve part 41 has three axially extending grooves 54 on its inner surface. The three grooves 54 are equally spaced around the inner surface of the valve sleeve part 41. Each of the grooves 54 communicates with a respective passage 55. The passages 55 extend radially through the valve sleeve part 41, and communicate with an annulus 56 in the housing 11. The annulus 56 communicates with a housing passage 58. The housing passage 58 in turn communicates with the chamber portion 18 through a hydraulic line 59.

As further shown in FIG. 3, the valve sleeve part 41 includes three other axially extending grooves 60 on its inner surface. The grooves 60 also are equally spaced around the inner surface of the valve sleeve part 41. Each of the grooves 60 communicates with a respective passage 61. The passages 61 extend radially through the valve sleeve part 41, and communicate directly with the chamber portion 16.

The valve core part 40 has an elongate cylindrical configuration, and is formed as one piece with the input shaft 31. As shown in FIG. 3, the valve core part 40 has a plurality of axially extending grooves at its outer surface. Three of the grooves 70 are spaced 120° apart about the outer circumference of the valve core part 40. The grooves 70 communicate with the inlet passages 50 in the surrounding valve sleeve part 41. Each of the grooves 70 also communicates equally with adjacent ones of the slots 54 and 60 in the surrounding valve sleeve part 41 when the valve core part 40 is in the centered position shown in FIG. 3.

Also equally spaced about the outer circumference of the valve core part 40, and located intermediate the grooves 70, are three axially extending grooves 72. Each of the grooves 72 communicates with a respective passage 74. The passages 74 extend radially through the valve core part 40 from the grooves 72 to an internal passage 75. The internal passage 75 also communicates with four radially directed passages 78 (FIG. 2). The passages 78 extend through the valve core part 40, and communicate with an annulus 80 in the housing 11. The annulus 80 in turn communicates with the return port R in the housing 11.

When the valve parts 40 and 41 are in the centered position shown in FIG. 3, the fluid pressure in the annulus 51 is communicated through the inlet passages 50 in the valve sleeve part 41 and into the grooves 70 on the valve core part 40. The grooves 70 communicate equally with the passages 55 and 61 in the valve sleeve part 41. Fluid pressure is thus delivered equally from the grooves 70 to the passages 55 and 61, and from the passages 55 and 61 to the chamber portions 18 and 16, respectively. The piston 14 therefore does not move when the valve parts 40 and 41 are in the centered position.

When the valve core part 40 is rotated in a clockwise direction relative to the valve sleeve part 41 from the centered position as viewed in FIG. 3, the grooves 60 and the adjoining passages 61 in the valve sleeve part 41 are blocked from communicating with the inlet passages 50. The grooves 54 and the adjoining passages 55 are simultaneously placed in greater fluid communication with the inlet passages 50. The hydraulic fluid then flows from the inlet passages 50 to the grooves 54 and through the passages 55 to the annulus 56 in the housing 11 (FIG. 1). The hydraulic fluid further flows from the annulus 56 through the passage 58 and the hydraulic line 59 to the chamber portion 18 Hydraulic fluid simultaneously vents from the chamber portion 16 by flowing through the passages 61 to the grooves 60 at the inner surface of the valve sleeve part 41. The hydraulic fluid flows from the grooves 60 at the inner surface of the valve sleeve part 41 into the grooves 72 at the outer surface of the valve core part 40. The hydraulic fluid then flows from the grooves 72 to the internal passage 75 through the radial passages 74 in the valve core part 40. The hydraulic fluid is conducted through the internal passage 75, through the passages 78, into the annulus 80 in the housing 11, and from the annulus 80 to the return port R in the housing 11. A suitable hydraulic line then conducts the hydraulic fluid to the fluid reservoir of the power steering pump. Such pressurizing of the chamber portion 18 and venting of the chamber portion 16 causes the piston 14 to move to the left as viewed in FIG. 1.

When the valve core part 40 is rotated in a counterclockwise direction relative to the valve sleeve part 41 from the centered position as viewed in FIG. 3, the hydraulic pressure in the inlet passages 50 is directed to the grooves 60 in the inner surface of the valve sleeve part 41 and through the passages 61 into the chamber portion 16. The fluid from the chamber portion 18 vents through the passage 58, the annulus 56, the passages 55 and the grooves 54 in the inner surface of the valve sleeve part 41. The fluid from the chamber portion 18 further vents through the grooves 72 in the outer surface of the valve core part 40, the passages 74, 75 and 78 in the valve core part 40, and the annulus 80 which communicates with the return port R. Such pressurizing of the chamber portion 16 and venting of the chamber portion 18 causes the piston 14 to move the right as viewed in FIG. 1.

The steering gear 10 also includes a plurality of seals for blocking leakage of the hydraulic fluid from the valve assembly 30. A shaft seal 120 is supported between the outer surface of the valve sleeve part 41 and the inner surface of the housing 11 at a location to the left of the annulus 80, as viewed in FIG. 2. An O-ring seal 122 is received in a groove in the inner surface of the housing 11 at a location to the right of the annulus 80. The shaft seal 120 and the O-ring seal 122 are thus located to seal the annulus 80. Two other O-ring seals 124 and 126 are received in grooves in the inner surface of the housing 11 on opposite sides of the annulus 56, and are thus located to seal the annulus 56. The O-ring seals 124 and 122 also seal the annulus 51, which is located between them. The O-ring seals 122-126 are formed of a resilient elastomeric material, as is known in the art.

A follow-up member 130 (FIG. 1) has a screw thread portion 132 formed in its outer periphery. A plurality of balls 134 are located in the screw thread portion 132. The balls 134 are also located in an internal threaded portion 136 formed in a bore 138 of the piston 14. Axial movement of the piston 14 causes the follow-up member 130 to rotate, as is well known. The valve sleeve part 41 is connected with the follow-up member 130. The valve sleeve part 41 therefore rotates with the follow-up member 130.

A torsion bar 140 is connected between the input shaft 31 and the follow-up member 130 by pins 142 and 144, respectively. When the valve core part 40 is rotated relative to the valve sleeve part 41 away from the centered position of FIG. 3, the piston 14 moves axially. When steering is terminated, the follow-up member 130 and the valve sleeve part 41 rotate relative to the valve core part 40 and return the valve parts 40 and 41 to the centered position.

The valve core part 40 sometimes vibrates relative to the valve sleeve part 41 when the steering gear 10 operates as described above. Inputs to the steering gear 10 can cause the valve core part 40 and the valve sleeve part 41 to oscillate relative to each other at their fundamental torsional frequency. As these parts oscillate, fluctuations in the hydraulic fluid pressure occur at that frequency in both portions 16 and 18 of the chamber 13. These fluctuations are especially large during steering maneuvers wherein the maximum hydraulic pressure assist is provided. The fluctuations in the pressure in the two chamber portions 16 and 18 are out of phase with each other and therefore develop an oscillating force acting on the piston 14. The oscillating force is transmitted from the piston 14 back to the valve sleeve part 41 through the follow-up member 130 and causes additional relative motion between the valve core part 40 and the valve sleeve part 41. The oscillations of the valve core part 40 relative to the valve sleeve part 41 are thereby sustained and amplified. These sustained and amplified oscillations can occur during various operating conditions of the steering gear 10, and can cause audible noises.

In order to minimize the noises which develop as described above, as well as to minimize other noises in the steering gear 10, the steering gear 10 further includes means for attenuating noise upon vibration of the valve core part 40 relative to the valve sleeve part 41. The noise attenuating means in the preferred embodiment of the invention comprises an elastomeric damping ring 200.

Figure 5:
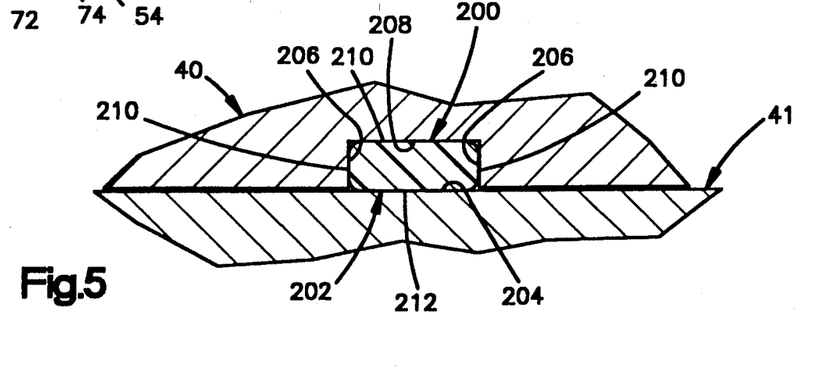
FIG. 5 is an enlarged partial view of parts of the steering gear shown in FIGS. 1 and 2.

As shown in FIG. 5, the damping ring 200 is received in a groove 202 in the outer surface of the valve core part 40. The damping ring 200 extends circumferentially around the adjoining cylindrical inner surface portion 204 of the valve sleeve part 41 in contact with the surface portion 204. When the hydraulic fluid flows through the valve assembly 30, the valve core part 40 vibrates relative to the valve sleeve part 41 as described above. Some of the energy of the relative motion between the valve core part 40 and the valve sleeve part 41 is dissipated by the damping ring 200 through viscous damping forces induced through shear deformation of the damping ring 200. The energy that is dissipated by the damping ring 200 in this manner would otherwise be expended through noise-making vibrations. The damping ring 200 thus attenuates noise in the steering gear 10 by damping vibrations of the valve core part 40 relative to the valve sleeve part 41.

The damping ring 200 is designed to optimize the amount of energy that is dissipated through its deformation. The damping ring 200 undergoes cyclic elastic deformation in response to vibrations of the valve core part 40 relative to the valve sleeve part 41. Specifically, the damping ring 200 is placed in shear upon movement of the valve core part 40 relative to the valve sleeve part 41. When the damping ring 200 is thus placed in shear, an amount of energy is stored in the damping ring 200. That amount of energy is subsequently expended by the damping ring 200 when it resiliently returns to its original configuration. Moreover, the damping ring 200 also dissipates energy in the form of heat when it undergoes cyclic elastic deformation. The damping ring 200 thus experiences hysteretic energy loss. The amount of energy lost through hysteresis in the damping ring 200 is proportional to the frequency of the cyclic deformations. The damping ring 200 is designed to experience an optimum amount of hysteretic energy loss when subjected to cyclic deformations having the frequency of the loudest vibrations of the valve core part 40 relative to the valve sleeve part 41. The damping ring 200 is thus designed to dissipate through hysteresis an optimum amount of energy which otherwise would contribute to undesirable noise in the steering gear 10.

The damping ring 200 has a number of properties which tend to optimize the amount of hysteretic energy loss. One such property of the damping ring 200 is represented by the loss tangent of the elastomeric material of the damping ring 200. The loss tangent of an elastomeric material is a viscoelastic function of the frequency of applied cyclic deformations. As noted above, a first amount of energy is stored in the damping ring 200 and a second amount of energy is dissipated as heat during cyclic deformation of the damping ring 200. These amounts of energy can be measured by two shear moduli $G'$ and $G''$ of the elastomeric material. The storage modulus $G'$ is a measure of the stored energy. The loss modulus $G''$ is a measure of the energy which is dissipated as heat. The loss tangent is the ratio of the loss modulus G" to the storage modulus G'. The material of the damping ring 200 is designed to have a loss tangent which is relatively high at the frequency of the loudest vibrations in the valve assembly 30. The loss tangent of the material of the damping ring 200 thus indicates that a relatively great amount of energy is lost through hysteresis at that frequency. Specifically, the valve assembly 30 generates an especially loud noise when the valve core part 40 vibrates relative to the valve sleeve part 41 at frequencies within the range of 100-300 Hertz. Therefore, the damping ring 200 in the preferred embodiment of the invention is formed of an elastomeric material having a loss tangent of at least 0.5 when subjected to vibrations having a frequency of approximately 100-300 Hertz. That value of the loss tangent is found to render the vibrations substantially inaudible to the occupants of the vehicle.

The loss tangent of the elastomeric material of the damping ring 200 is most preferably within the range of 0.5 to 2.0 for frequencies within the range of 100-300 hertz. If the loss tangent were substantially greater than 2.0, the amount of energy stored in the damping ring 200 could be too low to sufficiently return the damping ring 200 elastically from a deformed configuration toward its original configuration. The damping ring 200 could then undesirably resist movement of the valve core part 40 and the valve sleeve part 41 back to their centered positions during a steering maneuver. The tendency of the damping ring 200 to experience a relatively great amount of hysteretic energy loss can also be expressed in terms of the relatively low resilience of the elastomeric material of which it is formed. The resilience of an elastomeric material can be described as the ratio of the energy given up on recovery from deformation to the energy required to produce the deformation. A material in which a relatively greater amount of energy is dissipated as heat through hysteretic energy loss will give up a correspondingly lesser amount of energy upon recovery from deformation. Such a material will thus have a relatively less degree of resilience. The material of the damping ring 200 is designed to having such a relatively lesser degree of resilience, and therefore to experience a relatively greater degree of hysteretic energy loss.

The resilience of the material of the damping ring 200 can be expressed quantitatively in terms of the time required for the material to recover 90% of imposed strain. A short recovery time indicates a relatively high degree of resilience. A long recovery time indicates a relatively low degree of resilience. The damping ring 200 is designed to recover 90% of imposed strain in approximately 5-10 seconds, and thus has a very low degree of resilience. The resilience can also be expressed quantitatively in terms of the Yerzley resilience, as identified in ASTM standard D 945-55. The Yerzley resilience is the percentage of deflection to which an elastomeric part will return on its first cycle after release from a given initial deflection. The material of the damping ring 200 has a Yerzley resilience of approximately 30% or less.

The elastomeric material of the damping ring 200 preferably has the formulation recited in Table I below. By way of comparison, Table I also recites a typical formulation for the elastomeric material of an O-ring seal that would be used in a hydraulic power steering assembly.

TABLE I

| | O-Ring | Damping Ring 200 |
|---|---|---|
| Polymer (ACN = 38 mole-%) | 100. | 100. |
| Stearic Acid | 1. | 1. |
| Zinc Oxide | 5. | 5. |
| Antioxidants | 3.5 | — |
| Carbon Black | 40. | 80. |
| Peroxide 40KE | 7.5 | — |
| Triallyliso cyanurate Coagent | 5. | — |
| Low MW nitrile (Hycar 1312) | — | 25 |
| Sulfur | — | 0.13 |
| Organic Accelerator | — | .75 |
| EPDM Rubber | — | 10. |
| TOTAL | 162. | 221.88 |

As shown in Table I, the damping ring 200 includes an amount of carbon black which substantially exceeds the amount typically found in an O-ring seal. The carbon black in the damping ring 200 effectively dilutes the formulation to render it less resilient. The low MW nitrile rubber also renders the formulation less resilient, as does the EPDM rubber, which acts as a plasticizer. The low sulfur concentration also is significant in reducing the resilience of the formulation. In comparison to the peroxide in the O-ring, which is a catalyst for vulcanization and provides a relatively high cross-link density, the sulfur in the damping ring 200 is a participant in vulcanization and becomes bonded to the rubber. The result is a lesser degree of cross-linking with a correspondingly lesser degree of resilience.

Figure 4:
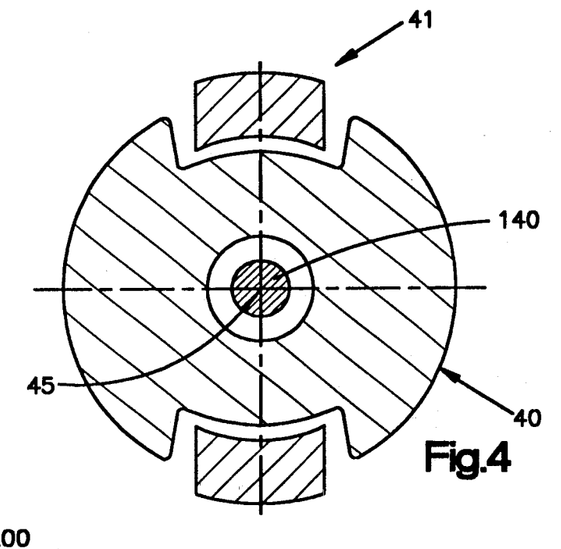
FIG. 4 is a view taken on line 4—4 of FIG. 2.

The fit of the damping ring 200 in the groove 202 also contributes to the tendency of the damping ring to optimize the amount of energy that is lost to the damping ring 200 by the vibrating valve core part 40 and valve sleeve part 41. As shown in FIG. 4, the groove 202 in the outer surface of the valve core part 40 has a rectangular cross-sectional shape with a base wall 206 and a pair of side walls 208. The damping ring 200 originally has a circular cross-sectional shape. When the damping ring 200 is received in the groove 202 as shown in FIG. 4, it is frictionally engaged with the walls 206 and 208 of the groove 202, and is compressibly deformed so as to bulge outward of the groove 202 against the valve sleeve part 41. The damping ring 200 is thus received in the groove 202 with an interference fit which supports the damping ring 200 in the groove 202 during operation of the steering gear 10.

Preferably, the damping ring 200 is received in the groove 202 with an interference fit in which the damping ring 200 occupies approximately 80-100% of the volume of the groove 202. The damping ring 200 most preferably occupies approximately 90% of the volume of the groove 202. This is in distinction to the fit of a standard O-ring, which generally occupies only about 62 to 72% of the volume of an associated groove. The total area of the surface portions 210 of the damping ring which are frictionally engaged with the walls 206 and 208 of the groove 202 is thus maximized. Moreover, the damping ring 200 bulges outward of the groove 202 as described above. The portion of the damping ring 200 which bulges outward of the groove 202 is pressed against the valve sleeve part 41, and is deformed so as to spread out over the adjoining surface portion 204 of the valve sleeve part 41. Therefore, the area of the surface portion 212 of the damping ring 200 which is pressed against the surface portion 204 of the valve sleeve part 41 also is maximized.

The vibrations of the valve core part 40 relative to the valve sleeve part 41 are primarily torsional, and thus consist primarily of circumferential movements between the two parts. When the valve sleeve part 41 moves circumferentially relative to the valve core part 40, movement of the damping ring 200 relative to the valve core part 40 is resisted by a static frictional force between the surface portion 210 on the damping ring 200 and the wall surfaces 206 and 208 in the groove 202. The damping ring 200 is simultaneously urged to move with the valve sleeve part 41 by a static frictional force between the surface portion 212 on the damping ring 200 and the surface portion 204 of the valve sleeve part 41. These static frictional forces are designed to be greater than the force required to deform the damping ring 200 in shear when the valve sleeve part 41 moves circumferentially relative to the valve core part 40. These static frictional forces thus cause the damping ring 200 to be deformed in shear when the valve part 41 moves circumferentially relative to the valve core part 40. The magnitude of each static frictional force is a function of the associated surface areas and the coefficient of friction of the material of the damping ring 200 in contact with the metal. Because the areas of the surface portions 210 and 212 are maximized by the interference fit of the damping ring 200 in the groove 202, the static frictional forces and the resulting deformation in shear are also maximized for a given material of which the damping ring 200 is formed. The potential for hysteretic energy loss in the damping ring 200 increases with the amount of shear during cyclic deformation of the damping ring 200. Since the amount of shear is maximized, the potential for hysteretic energy loss is likewise maximized. The interference fit thus contributes to the amount of hysteretic energy loss experienced by the damping ring 200 in response to vibrations of the valve core part 40 relative to the valve sleeve part 41.

The valve core part 40 and the valve sleeve part 41 rotate relative to each other up to approximately 6.0°. In the preferred embodiment of the invention, the surface 212 of the damping ring 200 will move with the adjoining surface portion 204 of the valve sleeve part 41 throughout 0.5° of continuous circumferential movement of the valve sleeve part 41 before slipping, and most preferably throughout 0.5° to 1.0° before slipping. The noise-making oscillations in the valve assembly 30 are found to increase gradually during the first 3.0° of relative movement between the valve core part 40 and the valve sleeve part 41. The low frequency instabilities in the steering gear 10 which cause undesirable noises result from amplification of these oscillations, as described above. Since the damping ring 200 dissipates energy through hysteretic energy loss upon deformation in shear during the first 0.5° of relative movement, it prevents the noise-making oscillations from ever getting started to an extent that would result in the instabilities that cause undesirable levels of noise. However, the material of the damping ring 200 should not stick to the surface 204 to the extent that the damping ring 200 would excessively resist relative rotation between the valve core part 40 and valve sleeve part 41, particularly when those parts are returning to their centered positions as shown in FIG. 3. The numerical values of the various properties described above are designed to permit the valve core part 40 and valve sleeve part 41, particularly when those parts are returning to their centered positions as shown in FIG. 3. The numerical values of the various properties described above are designed to permit the valve core part 40 and valve sleeve part 41 to rotate without undue interference from the damping ring 200 during operation of the steering gear 10.

From the above description of the invention, those skilled in the art will perceive improvements, changes and modifications. Such improvements, changes and modifications within the skill of the art are intended to be covered by the appended claims.

Having described the invention, the following is claimed:

1. In a hydraulic power steering apparatus having:
   a rotatable input member;
   a rotatable output member;
   a housing supporting said input member and said output member for rotation about an axis relative to each other; and
   hydraulic valve means comprising a valve core and a valve sleeve;
   said valve core having a cylindrical surface and being supported in said housing to rotate with said input member relative to said output member and said valve sleeve;
   said valve sleeve being supported in said housing to rotate with said output member relative to said input member and said valve core, said valve sleeve having a cylindrical surface adjoining said cylindrical surface of said valve core;
   the improvement comprising:
   means for attenuating noise caused by vibrations of said valve core relative to said valve sleeve, said noise attenuating means comprising an elastomeric damping ring extending circumferentially between said adjoining cylindrical surfaces of said valve core and said valve sleeve, said damping ring being compressibly deformed by said valve core and said valve sleeve in an interference fit between said adjoining cylindrical surfaces, said interference fit continuously maintaining frictional contact of said damping ring with said adjoining cylindrical surfaces whenever said valve core and said valve sleeve rotate relative to each other;
   said frictional contact providing static friction which is great enough to cause said damping ring to undergo cyclic deformation in shear between said adjoining cylindrical surfaces when said vibrations occur, said static friction thus being great enough to cause said damping ring to experience hysteretic energy loss which dissipates energy of said vibrations; and
   said damping ring being formed of an elastomeric material having a loss tangent of at least 0.5 when subjected to vibrations at frequencies of approximately 100–300 Hertz, whereby said damping ring experiences said hysteretic energy loss in an amount which substantially eliminates noise caused by said vibrations at said frequencies.

2. A hydraulic power steering apparatus as defined in claim 1 wherein said loss tangent is within the range of 0.5–2.0 for vibrations of approximately 100–300 Hertz.

3. A hydraulic power steering apparatus as defined in claim 1 wherein the elastomeric material of said damping ring has low resilience requiring approximately 5–10 seconds to recover 90% of imposed strain.

4. A hydraulic power steering apparatus as defined in claim 1 wherein said valve sleeve is rotatable relative to said valve core throughout a range of continuous movement about said axis from a centered position, said static friction being great enough to cause said damping ring to deform in shear between said adjoining cylindrical surfaces throughout a first portion of said range of continuous movement, said frictional contact further providing sliding friction between said damping ring and one of said adjoining cylindrical surfaces throughout a first portion remainder of said range of continuous movement, said first portion of said range of continuous movement extending at least 0.5° about said axis.

5. A hydraulic power steering apparatus as defined in claim 4 wherein said range of continuous movement extends approximately 6.0° about said axis, said first portion of said range of continuous movement extending from 0.5° to 1.0° about said axis.

* * * * *

UNITED STATES PATENT AND TRADEMARK OFFICE
CERTIFICATE OF CORRECTION

PATENT NO. : 5,287,792

DATED : February 22, 1994

INVENTOR(S) : Robert S. Betros and Jon W. Martin

It is certified that error appears in the above-identified patent and that said Letters Patent is hereby corrected as shown below:

Column 11, lines 6-7, delete "a first portion" and insert --the--.

Signed and Sealed this

Second Day of August, 1994

Attest:

BRUCE LEHMAN

*Attesting Officer*        *Commissioner of Patents and Trademarks*